United States Patent [19]
Petersen et al.

[11] Patent Number: 5,355,712
[45] Date of Patent: Oct. 18, 1994

[54] METHOD AND APPARATUS FOR THERMALLY ACTUATED SELF TESTING OF SILICON STRUCTURES

[75] Inventors: Kurt Petersen, San Jose; Farzad Pourahmadi, Fremont, both of Calif.; Russell Craddock, Birmingham, England

[73] Assignee: Lucas NovaSensor, Fremont, Calif.

[21] Appl. No.: 758,836

[22] Filed: Sep. 13, 1991

[51] Int. Cl.$^5$ .............................................. G01P 21/00
[52] U.S. Cl. ....................................... 73/4 R; 73/1 D
[58] Field of Search ................... 73/1 B, 1 C, 1 D, 2, 73/4 R, 517 R, 727, 849, 777, 862.68, 105; 310/320

[56] References Cited

U.S. PATENT DOCUMENTS

| | | | |
|---|---|---|---|
| 3,303,452 | 2/1967 | Booth | 73/796 |
| 4,686,440 | 8/1987 | Hatamura et al. | 318/646 |
| 4,750,364 | 6/1988 | Kawamura et al. | 73/517 R |
| 4,776,924 | 10/1988 | Delapierre | 73/517 R |
| 4,831,304 | 5/1989 | Dorey et al. | 73/777 |
| 4,945,769 | 8/1990 | Sidner et al. | 73/727 |
| 5,022,272 | 6/1991 | Bronowicki et al. | 73/772 |
| 5,060,504 | 10/1991 | White et al. | 73/1 D |

FOREIGN PATENT DOCUMENTS

| | | | |
|---|---|---|---|
| 8910567 | 11/1989 | United Kingdom | 73/517 R |
| 8200054 | 1/1982 | World Int. Prop. O. | 73/1 B |

*Primary Examiner*—Robert Raevis
*Attorney, Agent, or Firm*—Nixon & Vanderhye

[57] ABSTRACT

The present invention discloses a method and apparatus for testing the operational capability of flexure area equipped sensors especially those made of micromachined silicon. A thermal actuator beam is provided to bridge the structures which are joined by the flexure area. During the test, the beam's temperature is changed relative to that of the flexure area so as to provide a differential expansion or contraction. The result is that the flexure area bends and conventional bending sensors for the flexure area can sense the amount of bend. By comparing the actual amount of bend sensed with the amount expected from the temperature change applied to the beam, the operational capability can be determined.

13 Claims, 4 Drawing Sheets

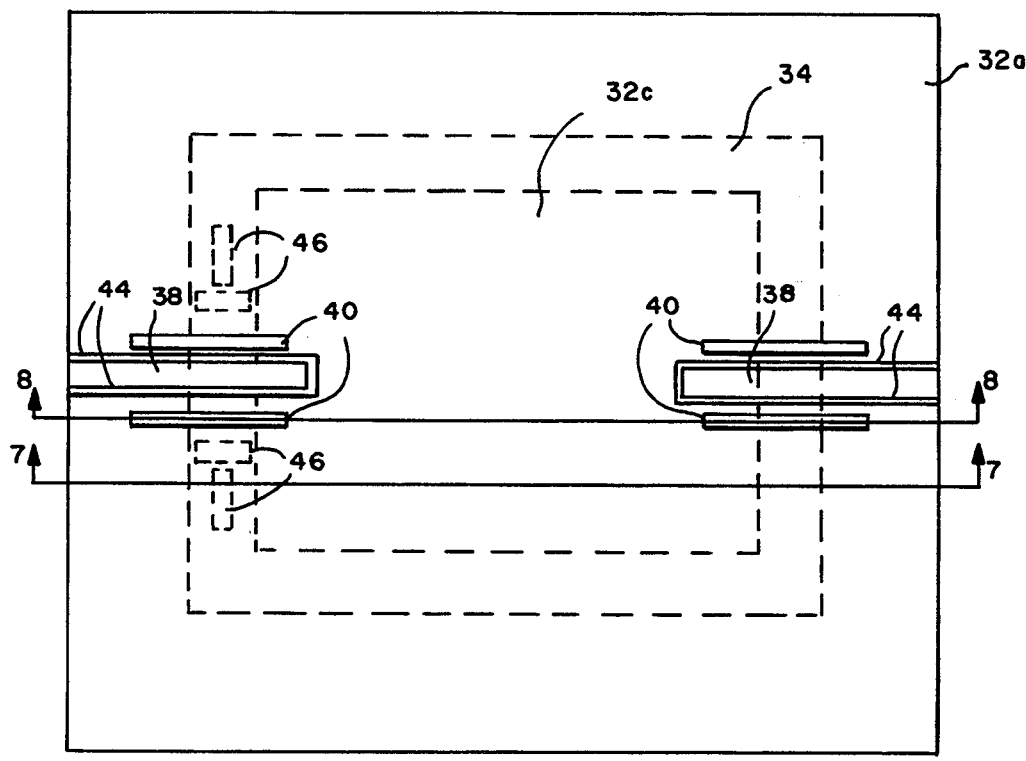
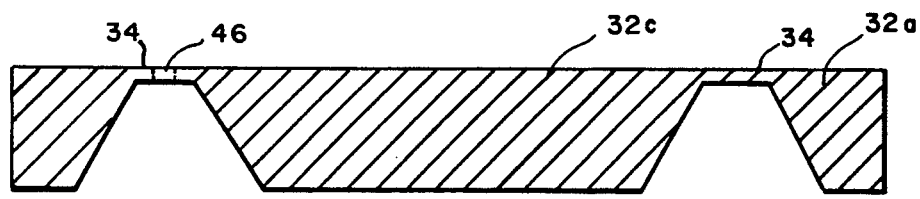
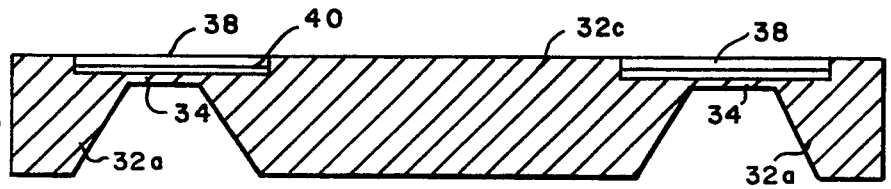

METHOD AND APPARATUS FOR THERMALLY ACTUATED SELF TESTING OF SILICON STRUCTURES

BACKGROUND OF THE INVENTION

1. Field of the Invention

This invention relates to the self testing of micromachined silicon structures in general and to the method and apparatus for thermally actuated self testing of a silicon flexure strain indicator.

2. Description of the Prior Art

Many micromechanical silicon devices are now well known, including sensors for sensing force, pressure, acceleration, chemical concentration, etc. Such devices are termed "micromechanical" because of their small dimensions on the order of a few millimeters square. Such sizes are achieved by utilizing a photolithographic technique similar to that employed in the fabrication of integrated circuits. Silicon wafers well known in the integrated circuit technology can also be used for micromachined structural elements and have the advantage that additional control or sensing electronic circuitry can be formed in conjunction with the structure providing the sensing, in order to process the resultant electrical signal.

Micromachined silicon is well known in a number of different applications. Many operational devices depend upon the flexing of a thin area of silicon which connects relatively thicker areas of unconnected silicon, the so-called "boss" areas. For example, in a pressure transducer, there may be a large, relatively stiff, silicon diaphragm boss bounded by a thin, relatively flexible area along its periphery which permits the diaphragm to move and the thin area to flex depending upon pressure differentials on the sides of the diaphragm. A detailed discussion of the use of relatively thin flexure areas and relatively thick boss areas for pressure or other type silicon sensors is contained in "Low Pressure Sensors Employing Bossed Diaphragms and Precision Etch-Stopping" by Mallon, Barth, Pourahmadi, Vermeulin, Petersen and Bryzek published Jun. 25, 1989 herein incorporated by reference.

Silicon machined flexure areas are also used in accelerometers and the general concept is disclosed in U.S. Pat. No. 4,882,933 issued to Petersen et al on Nov. 28, 1989 also herein incorporated by reference. Common to both pressure sensors and accelerometers is the use of an impurity doped portion of the flexure area which changes resistance (generates a potential) depending upon the amount of flexure developed (piezoresistive effect).

The use of accelerometers, and particularly silicon accelerometers, in the automotive field has increased dramatically in the last several years. Market forces have encouraged development of low cost batch fabricated accelerometers. Primary among the automotive uses are for crash sensors to control driver and passenger air-bag deployment as well as ride motion sensors for active suspension systems and automatic braking systems (ABS). With respect to crash sensors, al acceleration sensor with full scale range of 25 to 100 g's can be used to detect an automobile collision and to determine whether or not a protective air-bag should be inflated. For ride motion sensors, sensitivity for relatively low accelerations is necessary with accelerations being in the range of 0.5 to 2 g.

As discussed in the '933 patent, silicon sensors are rather brittle and the breakage problem can reduce the batch yield for such sensors. Generally in silicon accelerometers, a seismic mass is connected to the supporting frame of the chip by a flexible beam such that stress sensitive resistors located on the beam measure the mass' deflection and therefore the acceleration of the chip itself. The '933 discusses an accelerometer embodiment with bidirectional shock protection, as well as controllable viscous damping.

However, whether crash sensing accelerometers in the range of 25 to 100 g's are concerned or ride motion sensor accelerometers in the range of 0 to 2 g are needed, there exists no low cost method of testing the operational accuracy of such accelerometers. Additionally, there is also no low cost method of testing the operability and/or accuracy of silicon pressure sensors.

In the past, a relatively expensive method of testing was to provide conductive portions on the seismic mass and the supporting chip and a substantial voltage potential is applied to the two portions. The electrostatic attraction deflects the seismic mass in the normal flexure direction simulating an acceleration applied to the accelerometer. Unfortunately, relatively high voltages on the order of 50 volts or more are required to simulate a 50 g acceleration force and such voltage levels are difficult and/or expensive to generate, especially at low cost for application in an automotive environment.

SUMMARY OF THE INVENTION

In view of the above and other difficulties associated with the conventional method of testing flexure beams, it is an object of the present invention to utilize a thermal actuation mechanism for physically deflecting a flexure beam.

It is an additional object of the present invention to provide a thermally actuated self-test mechanism for flexure beams utilizing the application of a low voltage current pulse.

It is a further object of the present invention to provide a thermally actuated self-test mechanism for deflecting the flexure beam of an accelerometer to determine its operational capabilities.

It is an additional object of the present invention to provide a method and apparatus for thermally actuating the flexure beam of a pressure sensor in order to determine its operational capabilities.

The above and other objects are achieved in accordance with the present invention by providing a structure for heating a portion of the flexure beam or diaphragm. If only a portion of the beam is heated, the thermal expansion of that portion of the beam coupled with little or no thermal expansion of the remainder of the beam causes the beam to deflect in the flexure direction. Deflection in the flexure direction in turn changes the resistance of the piezoresistive sensing resistors in the beam allowing the change in resistance to be monitored.

In a preferred embodiment, the thermal actuation beams are insulated by an air gap from the remainder of the flexure beam and they are also doped to be resistors. A low voltage current pulse is applied to the resistor region in the beam and serves to heat the beam so that it expands, forcing the flexure to move in the flexure direction.

DESCRIPTION OF THE ACCOMPANYING DRAWINGS

Other objects and features of the invention will become apparent to those of ordinary skill in the art by reference to the following Figures wherein:

FIG. 6 is a top view of a silicon pressure sensor in accordance with the present invention;

FIG. 7 is a side cross sectional view of FIG. 6 along section lines 7—7;

FIG. 8 is a side cross sectional view of FIG. 6 along section lines 8—8;

DETAILED DESCRIPTION OF PREFERRED EMBODIMENTS

Figure 1:
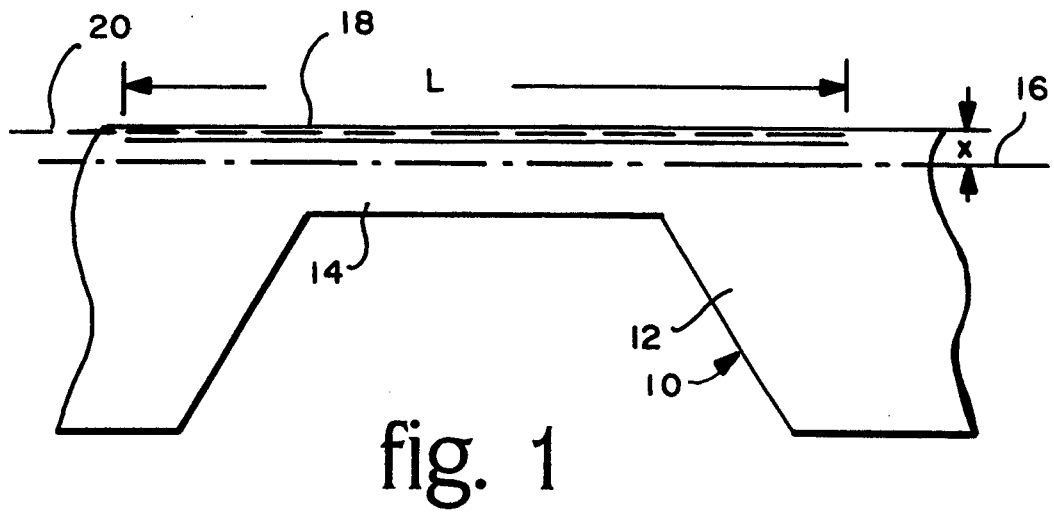
FIG. 1 is a side view of a silicon flexure prior to localized heating of the flexure beam.

Referring now to the drawings wherein similar reference numbers indicate similar structures among the several views, FIG. 1 illustrates both the theory and one embodiment of the present invention. A silicon structure 10 is machined to have thickened "boss" areas 12 and locally thin "flexure" areas 14. The flexure area 14 has a "neutral" axis 16 as shown by the dash-dot line. The neutral axis 16, as is conventionally defined in mechanical engineering texts, is that line in the silicon structure which, when the flexure area is bent, is neither under compression nor tension.

Disposed on the flexure area 14 is a thermal actuator 18 which has a longitudinal axis of expansion as shown by dashed lines 20. In a preferred embodiment, the thermal actuator 18 contains a doped portion of silicon which acts as a localized resistive heating element, although any other structure providing localized heating or cooling of the portion of a silicon structure 10 indicated by thermal actuator 18 would suffice. For the purpose of discussing FIGS. 1 and 2, thermal actuator 18 will subsequently be considered a heater and the operation with respect to a heater will be discussed.

It is to be noted that prior to activation of the thermal actuator, it has a region length of L as shown by the arrows. Even though the thermal actuator in a preferred embodiment is silicon itself, if it is energized, heat generated by passing an electric current through the doped silicon resistor will raise the temperature of the silicon structure. The silicon will have the highest temperature in the vicinity of the thermal actuator 18 with a decreasing temperature distribution as one proceeds through the remainder of the flexure area 14. This is due to heat transfer to the remainder of the flexure area, although it can be seen that even after an extended period of time there will still be a steady state temperature distribution with the hottest portion of the flexure area being the thermal actuator 18 and the coolest portion being that portion of the silicon structure farthest from the thermal actuator 18.

The longitudinal expansion axis 20 of the expansion region of the thermal actuator 18 is displaced by a distance x from the neutral axis 16 of the flexure area 14. The expansion axis is the imaginary axis upon which a point source would push to produce the same bending effect on the flexure beam as the stress distribution due to the thermal distribution through the thermal actuator beams due to the surface heater. Thus it is possible that the neutral axis of the thermal actuator could be coincident with the neutral axis of the flexure beam, but due to the temperature distribution due to the heater location and/or characteristics, the expansion axis would be offset slightly and thereby providing a moment arm x upon which the compressive forces can act to bend the flexure beam.

Figure 2:
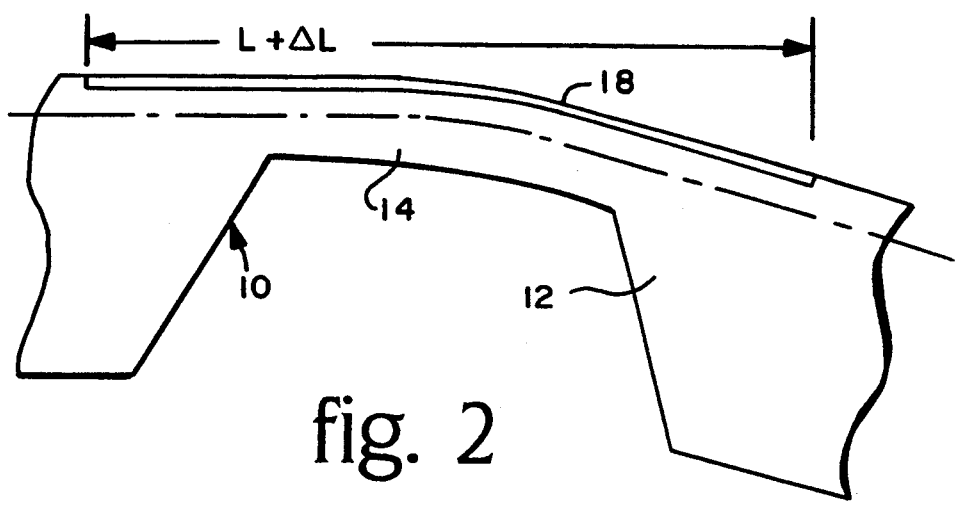
FIG. 2 is a side view of the silicon flexure of FIG. 1 deflected in the flexure direction during localized heating of a portion of the flexure beam.

As a consequence of the displacement of the axis of expansion from the neutral axis (resulting from an asymmetric temperature profile across the flexure area 14) will always result upon activation of thermal actuator 18. The result of the asymmetric temperature profile is that the thermal actuator 18 and its vicinity being hotter will expand a greater amount than the cooler portions of the flexure area 14 which are located away from the thermal actuator 18. As a result, the silicon structure will bend downward as shown in FIG. 2 because the length L has now expanded slightly $\Delta L$ (due to heating of the thermal actuator 18) to a total length of L plus $\Delta L$. It can be seen that if the axis of expansion of the thermal actuator were located on the neutral axis, there would be a symmetrical temperature profile across the flexure area. Although this would probably generate internal stresses, there would be little or no bending of the flexure area itself.

If FIGS. 1 and 2 are presumed to be the flexure area of an accelerometer, it can be seen that the movable part on the right would be analogous to the seismic mass of the accelerometer. Thus, by applying current to the thermal actuator, the seismic mass can be moved a predetermined amount depending upon the dimensions of the flexure area, the thermal actuator, the current flow and the distance x. Thus, by activating the thermal actuator 18, a deflection of an accelerometer's seismic mass can be simulated quite accurately. During this deflection, the change in resistance of the piezoresistors contained in the flexure area (not shown in FIGS. 1 and 2) can be monitored to determine whether they properly report the degree of flex in the flexure area for the known deflection of the seismic mass.

FIGS. 1 and 2 can also represent the flexure area of the pressure sensor where the movable portion of the silicon structure is the diaphragm and the fixed portion is the mounted periphery of the diaphragm. Although not necessary, it would be desirable to have two thermal actuators, one on each side of the diaphragm so as to provide a uniform flexing force during activation of the thermal actuator 18.

Therefore, in accordance with the above, the present invention is applicable to any flexure area made by micromachining of silicon structures. FIGS. 1 and 2 illustrate the simplest embodiment in which the thermal actuator is actually a doped resistor portion or region of the silicon structure itself acting as a heater when an electric current is passed therethrough. As will be seen, the effectiveness of the thermal actuator can be increased if it is thermally isolated from adjacent portions of silicon structure.

Figure 3:
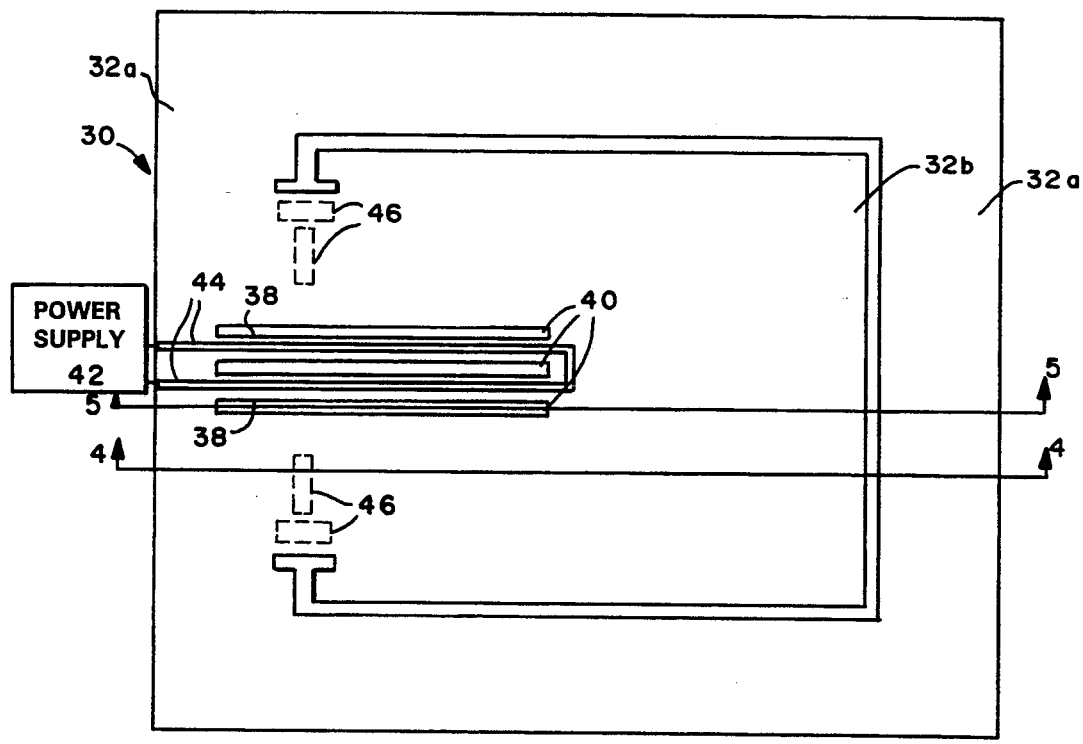
FIG. 3 is a top view of a silicon accelerometer in accordance with the present invention.
Figure 4:
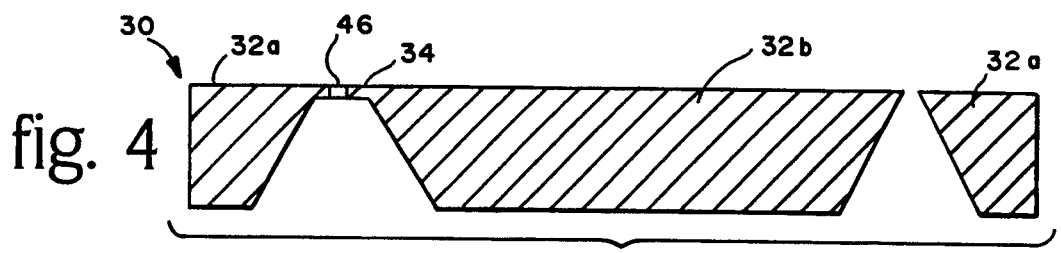
FIG. 4 is a side cross sectional view of FIG. 3 along section lines 4—4.
Figure 5:
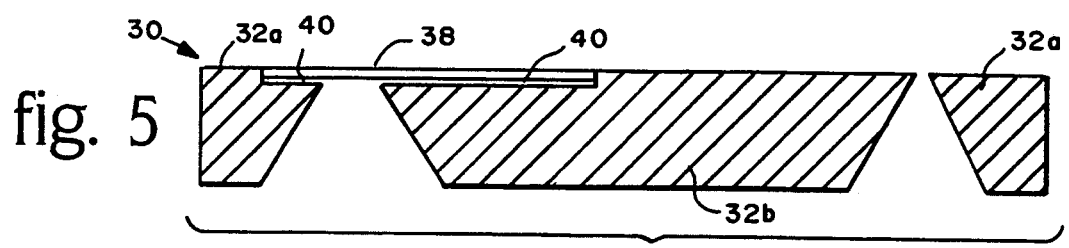
FIG. 5 is a side cross sectional view of FIG. 3 along section lines 5—5.

An improved embodiment can be seen in FIGS. 3, 4 and 5 which relate to a preferred embodiment of an accelerometer. The overall silicon structure 30 of the accelerometer in FIG. 3 is shown with FIGS. 4 and 5, comprising cross-section views of FIG. 3 along section lines 4—4 and 5—5, respectively. The accelerometer has boss areas comprising the seismic mass 32b and the support frame 32a. The seismic mass 32b is connected to support frame 32a at flexure area 34 which extends almost completely along one side of seismic mass 32b.

Etched into the flexure area itself are thermal actuator beams 38. Each of these beams has a length extending from its connection with support frame 32a to its connection with seismic mass 32b. It can also be seen that there are longitudinally extending slots 40 on either side of and under each of thermal actuator beams 38. These slots serve to insulate the thermal actuator beam 38 from adjacent silicon structure in both the vicinity of the flexure area as well as the support frame 32a and the seismic mass 32b. Essentially, the only connection of the thermal actuator beams is with the seismic mass and support frame at either end. The fact that the thermal actuator's beams are insulated from the rest of the silicon structure serves to reduce heat flow away from the beam when it is activated, thereby reducing the power requirement necessary to achieve the desired longitudinal expansion of the thermal actuator beams.

During operation of the self-test mechanism, power supply 42 is connected so as to supply a relatively low voltage current to a U-shaped resistive area 44 which serves to heat and thereby longitudinally expand thermal actuator beams 38. As seen in FIG. 5, the axis of expansion of the thermal actuator beams 38 is displaced slightly from the neutral axis of the flexure beam thereby causing deflection of the seismic mass. Finite element modeling has shown that in some embodiments of the present invention, an acceptable temperature rise will result in a full scale (50 g) deflection of the seismic mass.

It is noted that the actuating beams can be made from any conducting material including metals, polysilicon, or single crystal silicon by standard micromechanical processing techniques. Ideally, however, and, as shown in FIGS. 3 through 5, they are fabricated at the same time as the flexure beam and fabricated from the same material, i.e. single crystal silicon. The use of different materials for the thermal actuator beams will induce unwanted thermal effect offsets because as the sensor changes temperature, it is unlikely that the thermal actuator beam material will have the same coefficient of expansion as the remainder of the silicon material. Only when the same material, i.e. preferably single crystal silicon, is used will temperature effects be negligible.

It can be seen that when power supply 42 is energized thus heating up thermal actuator beams 38 and deflecting seismic mass 32b, , deflection sensors 46 (shown in dotted lines in FIGS. 3 and 4) will be stressed. Sensors 46 are resistively doped silicon whose resistance will change due to stress created during deflection of the flexure beam. Their change in resistance is measured and compared with a desired output given the power supply 42 input (the interconnection of the flexure beam output from sensors 46 is not shown for purposes of clarity). It is understood that the accelerometer illustrated in FIGS. 3, 4 and 5 could also incorporate bidirectional shock protection and/or viscous damping as discussed and disclosed in the '933 patent noted above.

FIG. 6 illustrates an embodiment of the present invention as applied to a pressure transducer in which the pressure transducer senses pressure differences between the pressure existing above and below diaphragm 32c. The diaphragm 32c is supported around its periphery by flexure area 34 which in turn is supported by support frame 32a. Just as in the accelerometer disclosed in FIGS. 3 through 5, one or more thermal actuator beams 38 are located across the flexure area. Slots 40 serve to thermally isolate the beam from the remainder of the flexure area. However, unlike the acceleration sensor shown in FIGS. 3 through 5, the pressure sensor is sealed such that slots 40 do not pass all the way through the flexure area thereby providing a path for fluid flow from an area of high pressure one side of diaphragm 32c to an area of lower pressure on the other side of diaphragm. This sealing requirement can be met by insuring that the total thickness of the slot and flexure beam 38 is less than the total thickness of the flexure area 34 in the vicinity of the thermal actuator beams 38.

FIGS. 6 through 8 illustrate an actuator beam 38 on opposite sides of the diaphragm 32c so as to provide a symmetrical loading for deflection of the diaphragm. However, a single beam in the vicinity of sensors 46 would suffice to deflect the diaphragm so as to check the output of the sensors.

The operation of the test aspect of the pressure sensor would be similar to that of the test of the accelerometer shown in FIGS. 3 through 5. In the FIG. 6 embodiment, power supply 42 would be connected to both U-shaped resistive areas 44 causing both beams 38 to expand. This expansion coupled with the beams location displaced from the neutral axis of the flexure area 34, taken as a whole, will cause each flexure area to bend thereby moving the diaphragm down. The deflection of the flexure area 34 will change the resistance of the sensors 46 which can be determined in a conventional manner.

Figure 9:
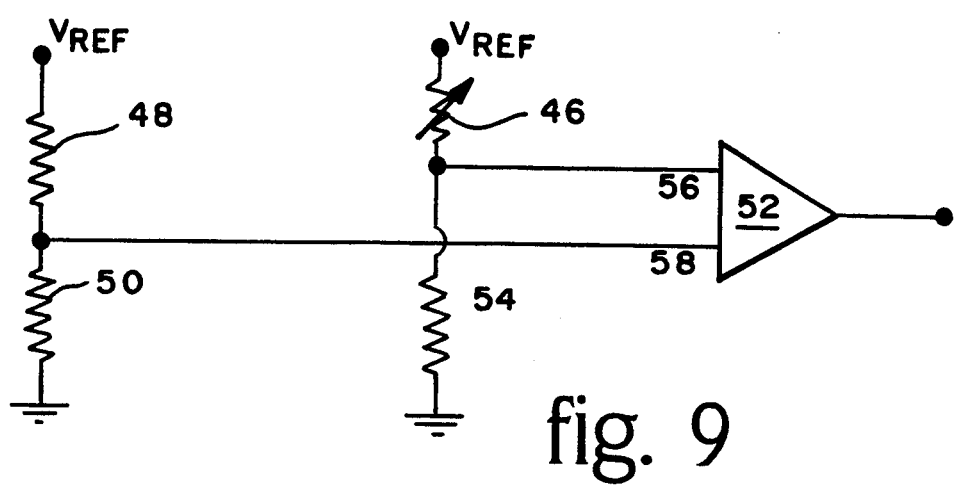
FIG. 9 is a schematic diagram of the flexbeam output measuring circuit.

FIG. 9 is a schematic circuit illustrating a simplified method of measuring the output of the flexbeam sensor 46. A reference voltage is applied to a voltage divider comprised of resistors 48 and 50 thereby providing a stable voltage to comparator 52. The same reference voltage is applied to the sensor 46 which is in series with fixed resistor 54. Because the resistance of sensor 46 will vary as its associated flexbeam deflects, the voltage applied to comparator 52 on sensor input line 56 will vary as compared to the voltage on reference input line 58. The comparator will indicate when the sensor related input exceeds the reference input. Appropriate choice of the values of resistors 48, 50 and 54 to correspond with the expected change in the sensor resistance during deflection expected by a given heating input to the thermal actuating beams, will permit the comparator 52 output to be an indication of the sensors operation during the self test operation. Other suitable circuits such as bridge circuits, A-to-D converters, etc. to evaluate the operation of the sensors 46 during deflection of the beam will be well known to those of ordinary skill in the art in view of the above discussion.

In addition to the expansion of the thermal actuator beam acting upon the moment arm x (its displacement from the beam neutral axis) causing the deflection of the flexure beam, another mechanism may also come into effect. As is known, when compressive stress on a column reaches a certain limit, buckling of the column is possible. The same may also be true of the thermal actuator beam if heated to provide a high enough compressive stress. Buckling of the thermal actuator beam may actually reduce the compressive stress on the thermal actuator beam but serves to create a torsional moment at the connections between the thermal actuator beam and the flexure beam, the frame or the movable silicon structure.

Figure 10:
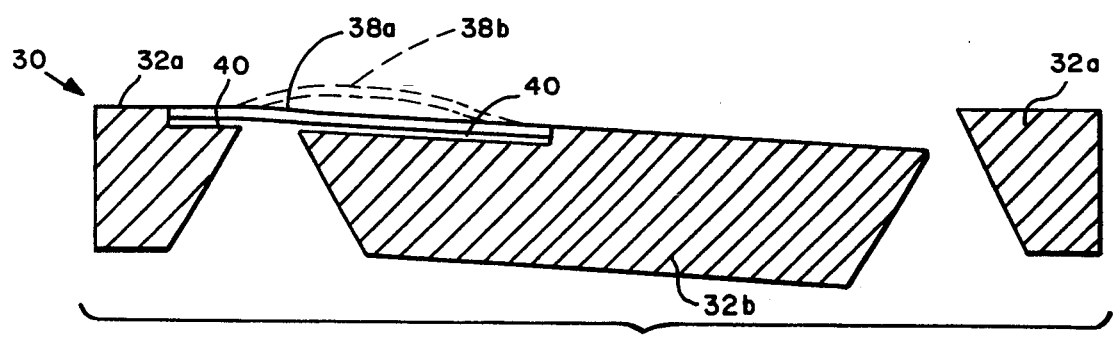
FIG. 10 is a side cross sectional view of FIG. 3 with the thermal actuator beam undergoing buckling.

The torsional-moment created by buckling of the thermal actuator beam may be greater or lesser than any change in the moment created by the compressive stress operating through the moment arm x when buckling occurs. Thus the actual deflection of the flexure beam may increase or decrease when buckling of the thermal actuator occurs. This is illustrated in FIG. 10 which shows deflection of the accelerometer of FIG. 3 due to expansion of the thermal actuator beam 38a in solid lines and due to buckling of the actuator beam 38b in dotted lines.

In view of the above disclosure and discussion, applicant notes that a number of modifications and variations of the present invention will be readily apparent to those of ordinary skill in the art. Multiple beams or series of beams can be utilized in any desired fashion to achieve a desired amount of deflection of silicon structure across a flexure area. Although the beam is disclosed as being heated or cooled, the entire flexure area could be heated or cooled relative to the beam.

Furthermore, even though in a preferred embodiment the means for providing an output comprises piezoresistive portion of the silicon structure itself, the present invention would be useful and operable where the output is provided by a capacitive sensor, optical sensor or any other position sensor. As long as the present invention can physically force the flexure beam to deflect and the device has a sensor to measure such deflection, the operation of the sensor can be tested by the present invention.

In the pressure sensor embodiment, the thickness of the flexure area can vary so as to permit a slightly thicker flexure area in the vicinity of the thermal actuator beams while at the same time sealing the upper portion of the diaphragm from the lower portion. It will be seen that where the thermal actuator beams are completely made up of the resistively doped silicon, the slots on either side also not only serve to thermally isolate the beam from the adjacent silicon structure, they also electrically insulate the beam from said structure so as to prevent a short circuit across the beam. While air is utilized as a thermal (and electrical) insulation for the beam, other insulation or even a lack of insulation (as shown in FIGS. 1 and 2) will be appropriate depending upon the power available to the self-test device and the micromachining complexity desired.

It is noted that not only can the thermal actuation test mechanism discussed above be used with a pressure sensor, it is also useful with motion sensing accelerometers as well as crash sensor accelerometers. In preferred embodiments, the motion sensing accelerometers have an operating range over plus or minus 2 g's while the crash sensing accelerometers operate over a range of plus or minus 50 g's and the above described self test system and method is capable of testing operation of each.

In addition to accelerometers and pressure sensors, the thermal actuation self-test mechanism can also be used for a valve which controls flow rate or even a flow rate measuring device. Therefore in a broad sense the present invention can be used to test any other structure which utilizes a flexure area, where flexing of the flexure area provides an operational output of the device.

Clearly, the sensors 46 do not have to be piezoresistive doped silicon and could be conventional strain gauges or printed microminiature strain gauges.

Therefore, and in accordance with the above, multiple variations on the theme discussed above will be obvious to those of ordinary skill in the art. Accordingly, the present invention is limited only by the claims appended hereto.

What is claimed is:

1. A method of testing a machined silicon structure, said silicon structure including at least one flexure beam means for permitting one portion of said silicon structure to move relative to another portion of said silicon structure in a flexure direction, said flexure beam means having a neutral axis, said silicon structure having a means for providing an output when flexed, said silicon structure including at least one thermal actuator beam having an axis of expansion and a length connecting said one portion of said silicon structure with said another portion of said silicon structure, said axis of expansion of said thermal actuator beam displaced from said neutral axis of said flexure beam means in a direction parallel to said flexure direction, said method comprising the steps of:

changing said length of said at least one thermal actuator beam thereby displacing said another portion with respect to said one portion and flexing said flexure beam; and comparing said flexure beam output when flexed to a value and indicating the operability of said means for providing an output, wherein said means for providing an output comprises a piezoresistive portion of said flexure beam means, and said comparing step includes comparing resistance of said piezoresistive portion with a fixed value of resistance, wherein said silicon structure comprises a pressure sensor and said one portion of said silicon structure is a diaphragm and said another portion of said silicon structure is a support frame, said flexure beam means comprises a silicon structure surrounding a periphery of said diaphragm and connecting said diaphragm periphery to said support frame, said changing step includes displacing said diaphragm with respect to said support frame.

2. A method of testing machined silicon material in accordance with claim 1, wherein each of said at least one thermal actuator beam includes a resistance path thereon and said changing step includes applying an electric current to said resistance path and thereby heating said beam.

3. A method of testing machined silicon material in accordance with claim 2, wherein said at least one thermal actuator beam comprises at least two thermal actuator beams and said changing step includes applying an electric current to said resistance paths and thereby heating said beam, said comparing step includes comparing said flexure beam output when flexed to a fixed reference value and indicating the operability of said means for providing an output when said reference value is exceeded.

4. A thermally actuated self test mechanism for a micro machined silicon structure, said silicon structure including at least one flexure beam means for permitting one portion of said silicon structure to move relative to another portion of said silicon structure in a flexure direction, said flexure beam means having a neutral axis, said silicon structure having a means for providing an output when flexed, said self test mechanism comprising:

at least one thermal actuator beam having an axis of expansion and a length connecting said one portion of said silicon structure with said another portion of said silicon structure, said axis of expansion of said at least one thermal actuator beam displaced from said neutral axis of said flexure beam means in a direction parallel to said flexure direction;

means for thermally changing said length of said at least one thermal actuator beam thereby displacing said another portion with respect to said one portion and flexing said flexure beam means; and means for comparing said output when said flexure beam means is flexed to a value and indicating the operability of said means for providing an output.

5. A thermally actuated self test mechanism in accordance with claim 4, wherein said means for providing an output comprises a piezoresistive portion of said flexure beam means.

6. A thermally actuated self test mechanism in accordance with claim 5, wherein said at least one thermal actuator beam includes means defining a resistance path thereon and said means for thermally changing includes means for applying an electric current to said resistance path and thereby heating said beam.

7. A thermally actuated self test mechanism in accordance with claim 6, wherein said at least one thermal actuator beam comprises at least two thermal actuator beams and said means for comparing includes means for comparing said flexure beam means output when flexed to a fixed reference value and for indicating the operability of said means for providing an output when said reference value is exceeded.

8. A thermally actuated self test mechanism in accordance with claim 5, wherein said silicon structure comprises a pressure sensor and said one portion of said silicon structure is a diaphragm and said another portion of said silicon structure is a support frame, said flexure beam means comprises a silicon structure surrounding a periphery of said diaphragm and connecting said diaphragm periphery to said support frame.

9. A thermally actuated self test mechanism in accordance with claim 8, wherein said at least one thermal actuator beam includes means defining a resistance path thereon and said means for thermally changing includes means for applying an electric current to said resistance path and thereby heating said beam.

10. A thermally actuated self test mechanism in accordance with claim 9, wherein said at least one thermal actuator beam comprises at least two thermal actuator beams and said means for comparing includes means for comparing said flexure beam means output when flexed to a fixed reference value and for indicating the operability of said means for providing an output when said reference value is exceeded.

11. A thermally actuated self test mechanism in accordance with claim 5, wherein said silicon structure comprises an accelerometer and said one portion of said silicon structure is a seismic mass and said another portion of said silicon structure is a support frame, said flexure beam means comprises a silicon structure supporting and connecting said seismic mass to said support frame.

12. A thermally actuated self test mechanism in accordance with claim 11, wherein said at least one thermal actuator beam includes means defining a resistance path thereon and said means for thermally changing includes means for applying an electric current to said resistance path and thereby heating said beam.

13. A thermally actuated self test mechanism in accordance with claim 12, wherein said at least one thermal actuator beam comprises at least two thermal actuator beams and said means for comparing includes means for comparing said flexure beam means output when flexed to a fixed reference value and for indicating the operability of said means for providing an output when said reference value is exceeded.

* * * * *